United States Patent
Takijiri et al.

(10) Patent No.: US 10,302,476 B2
(45) Date of Patent: May 28, 2019

(54) FLOW RATE CONTROL DEVICE

(71) Applicant: HORIBA STEC, Co., Ltd., Kyoto-shi, Kyoto (JP)

(72) Inventors: Kotaro Takijiri, Kyoto (JP); Atsushi Ieki, Kyoto (JP); Yuki Tanaka, Kyoto (JP)

(73) Assignee: HORIBA STEC, Co., Ltd., Kyoto-shi, Kyoto (JP)

(*) Notice: Subject to any disclaimer, the term of this patent is extended or adjusted under 35 U.S.C. 154(b) by 0 days.

(21) Appl. No.: 15/608,905

(22) Filed: May 30, 2017

(65) Prior Publication Data

US 2017/0343402 A1    Nov. 30, 2017

(30) Foreign Application Priority Data

May 31, 2016 (JP) ................. 2016-108383

(51) Int. Cl.
*F16K 37/00* (2006.01)
*G01F 1/696* (2006.01)
*G05B 13/02* (2006.01)
*G05D 7/06* (2006.01)
*G01F 15/00* (2006.01)

(52) U.S. Cl.
CPC .......... *G01F 1/6965* (2013.01); *F16K 37/005* (2013.01); *G01F 15/005* (2013.01); *G05B 13/021* (2013.01); *G05D 7/0629* (2013.01); *G05D 7/0635* (2013.01); *F16K 37/0091* (2013.01)

(58) Field of Classification Search
CPC .. F16K 37/0091; G01F 15/005; G01F 1/6965; G05B 13/021; G05D 7/0629
See application file for complete search history.

(56) References Cited

U.S. PATENT DOCUMENTS

| 5,691,896 A | * | 11/1997 | Zou | G05B 11/42 700/37 |
| 2005/0165498 A1 | * | 7/2005 | Tanaka | G05B 5/01 700/28 |
| 2007/0162214 A1 | * | 7/2007 | Junk | G05B 13/024 701/101 |
| 2017/0168509 A1 | * | 6/2017 | Ito | G05D 7/0635 |

FOREIGN PATENT DOCUMENTS

JP    2003316442 A    11/2003

* cited by examiner

*Primary Examiner* — Yuhui R Pan
(74) *Attorney, Agent, or Firm* — Alleman Hall Creasman & Tuttle LLP

(57) ABSTRACT

An operator is able to easily perform down-tuning while still achieving superior responsiveness and, in some cases, obtain an equivalent responsiveness as that obtained from the flow rate control device currently being used. In a flow rate control device that performs feedback control of a fluid control valve such that a measured flow rate closely approximates a target flow rate, there are provided a response lag input section that inputs a response lag set value, which is a value showing a response lag that an operator wishes to set, and a response lag generating section that generates response lags used in the feedback control in accordance with the response lag set values.

5 Claims, 5 Drawing Sheets

| MEASUREMENT TIME CONSTANT (msec) | FLUID TYPE | FLUID TEMPERATURE (°C) | FLUID PRESSURE (KPa) |
|---|---|---|---|
| 300 | a1 | 40 | 10 |
| 240 | a1 | 40 | 20 |
| 150 | b1 | 210 | 35 |
| ... | ... | ... | ... |

FIG.4

FLOW RATE CONTROL DEVICE

TECHNICAL FIELD

The present invention relates to a flow rate control device that is used to control flow rates of fluids such as material gases, chemical liquids, and cleaning solutions and the like that are used, for example, in a semiconductor manufacturing process.

TECHNICAL BACKGROUND

In a large number of industrial processes, control of the flow rates of a variety of processing fluids is necessary, and for this purpose a flow rate control device is provided on the flow path of these processing fluids.

Flow rate control devices such as this are required to be able to rapidly and stably control the flow rate of processing fluids at desired values (i.e., at target flow rates). Because of this, as is shown in Patent document 1, the valves and flow rate sensors and the like that are used, for example, to adjust the flow rate in a conventional flow rate control device are those having the best possible responsiveness, and these are then tuned so that they perform to their maximum capabilities regarding responsiveness and stability.

However, in a semiconductor manufacturing process in which a plurality of processing gases are used while the respective flow rates of each gas are controlled, if a high-performance flow rate control device having superior responsiveness is introduced in place of the flow rate control device already being used, then defects such as the final product (i.e., the semiconductor) not conforming to the desired specifications sometimes arise.

As a result of strenuous investigations, the applicants of the present invention discovered the cause of these defects.

Namely, conventionally, using the current flow rate control device, a processing recipe is determined via trial and error such that the final product (i.e., the semiconductor) has the desired specifications and performance. 'Processing recipe' refers, in the case of processing fluids, to the quantities of processing fluids and the timings when they are used. In other words, the processing recipe dictates how target flow rates for each processing fluid should be set.

However, the flow rates of the processing fluids that are actually used do not always accurately follow the target flow rates dictated on paper in the recipe, and sometimes delays (lags) are generated in the flow rate depending on the responsiveness of the flow rate control device.

Accordingly, if the current flow rate control device is replaced with a high-performance flow rate control device, because this new high-performance flow rate control device more precisely follows the target flow rate, the actual flow rate ends up being different from the conventional flow rate (i.e., from the recipe actually being implemented) which has not adequately followed the target flow rate, and the possibility arises that the final product will not conform to the specifications.

Because of this, conventionally, when a flow rate control device is replaced with a new type of apparatus or the like, an on-site operator who actually sets the flow rates of the processing gases has to correct the recipe, in other words, correct the target flow rates, once again via trial and error, and, particularly when a large number of processing fluids are used, this requires massive amounts of time and effort.

DOCUMENTS OF THE PRIOR ART

Patent Documents

Patent document 1 Japanese Unexamined Patent Application (JP-A) No. 2003-316442

DISCLOSURE OF THE INVENTION

Problems to be Solved by the Invention

The invention of the present application was conceived in view of the above-described novel problems and was achieved by firstly discarding the conventional idea of improving responsiveness. The present invention makes it possible for an operator to easily perform down-tuning while still achieving superior responsiveness and, in some cases, to obtain an equivalent responsiveness as that obtained from the flow rate control device currently being used.

Means for Solving the Problem

Namely, the flow rate control device according to the present invention performs feedback control of a fluid control valve such that a measured flow rate closely approximates a target flow rate, and is provided with a response lag input section that inputs a response lag set value, which is a value showing a response lag that an operator wishes to set, and a response lag generating section that generates the response lags used in the feedback control in accordance with the response lag set values.

According to the above-described structure, in a flow rate control device in which, a rapid response has hitherto been the sought after characteristic, not only is it possible to purposefully produce a response lag, but this response lag can be determined simply by a set input from an operator. Accordingly, this flow rate control device can be set to the same responsiveness as, for example, the current flow rate control device, and can easily be used to replace the current flow rate apparatus.

The above-described effect, namely, the effect whereby down-tuning of the responsiveness can be performed by an operator at any time is a completely new breakthrough in the field of flow rate control devices in which, conventionally, fast response speeds have been pursued.

In contrast, if the input response lag set values are reduced to their performance limit, then it also becomes possible to use the flow rate control device of the present invention while making full use of the fast response speeds inherent therein.

An example of a specific aspect of the flow rate control device of the present invention is one in which the response lag set value is a value that show a first order lag, a second order lag, or a lag of a greater order than this from which dead time has been excluded.

A time constant or the like can be given as an example of a response lag set value that is easily handled by an operator.

When setting a new response lag, the calculation can be easily performed by referring to past response lags and to the feedback control coefficient at that time. In order to do this, it is desirable for there to be further provided a response lag measurement section that measures a response lag by performing feedback control, and for the response lag generating section to calculate, based on measured response lags measured by the response lag measurement section and on a feedback control coefficient set at that time, a new feedback control coefficient that forms the set response lag shown in the response lag set values, and to replace the currently set feedback control coefficient with the new feedback control coefficient.

In order to enable a response lag to be set within a short time without having to perform complex calculations, it is preferable for the feedback control to include at least proportional control, and to be set such that a response lag excluding dead time is changed to a first order lag by using IMC.

Effects of the Invention

According to the present invention which is formed in the above-described manner, in a flow rate control device in which, conventionally, a fast response has hitherto been the sought after characteristic, not only is it possible to purposefully produce a response lag, but this response lag can be determined simply by a set input from an operator. Accordingly, this flow rate control device can be set to the same responsiveness as, for example, the current flow rate control device, and can easily be used to replace the current flow rate apparatus.

BRIEF DESCRIPTION OF THE DRAWINGS

FIG. 4 is a data exemplary diagram showing data (structure) stored in a response lag storage section according to the same embodiment.

BEST EMBODIMENTS FOR IMPLEMENTING THE INVENTION

Figure 1:
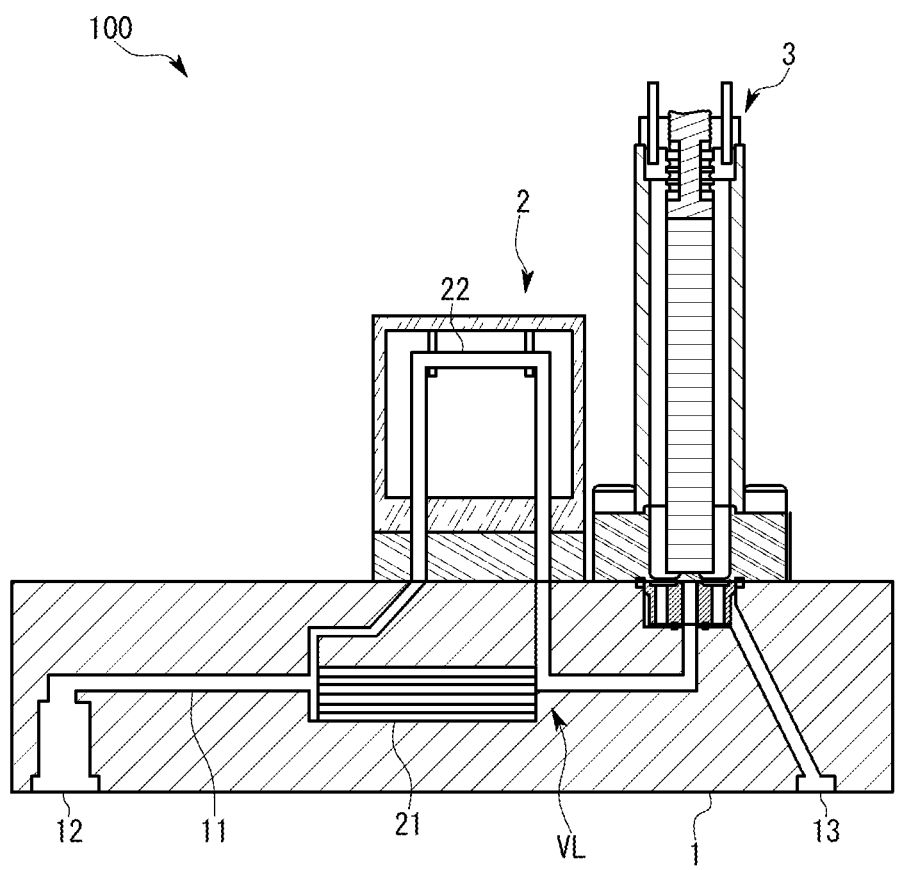
FIG. 1 is a typical overall view showing a flow rate control device according to an embodiment of the present invention.

A flow rate control device according to an embodiment of the present invention will now be described with reference made to FIG. 1 through FIG. 4.

A flow rate control device 100 is provided on each supply flow path (not shown in the drawings) along which flows a fluid such as, for example, various types of material gas used in semiconductor manufacturing, and is used to control the flow rate of each material gas at a predetermined flow rate. Note that examples of a fluid include liquids, slurries, and the like as well as gases.

A more detailed description will now be given.

Figure 2:
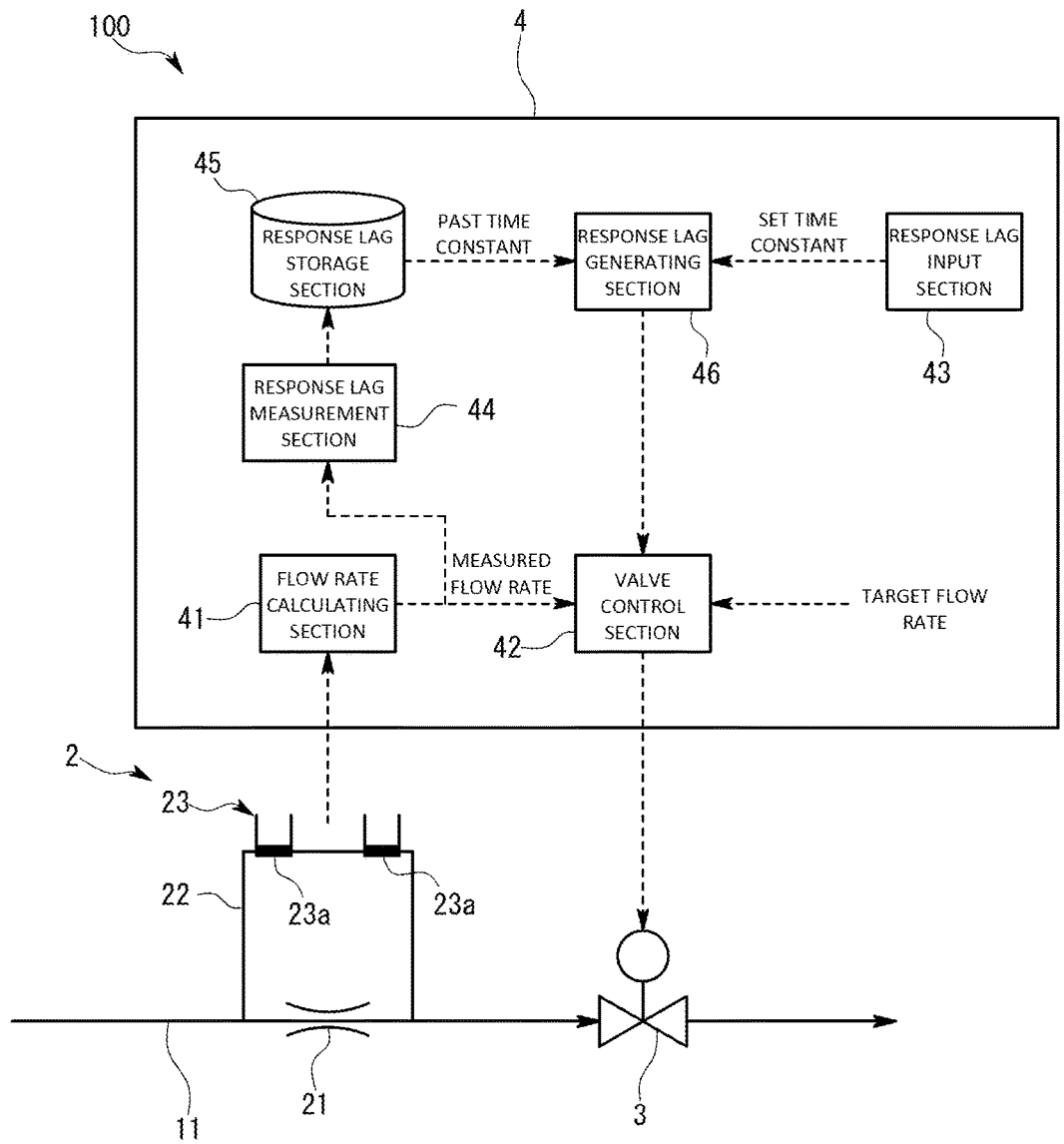
FIG. 2 is a function block diagram of a control mechanism according to the same embodiment.

As is shown in FIG. 1 and FIG. 2, this flow rate control device 100 is provided with a roughly rectangular parallelepiped-shaped body 1 inside which is formed a flow path 11, a thermal flow rate sensor 2 and a valve 3 that are mounted on the body 1, and a control mechanism 4 that controls the valve 3 based on outputs from the flow rate sensor 2.

An intake aperture 12 and a discharge aperture 13 that are used respectively for introducing and discharging fluids are both provided in a bottom surface of the body 1, and the flow path 11 is formed so as to connect the intake aperture 12 to the discharge aperture 13. The valve 3 is provided at the most downstream side of the flow path 11, and the flow rate sensor 2 is provided upstream from the valve 3.

The flow rate sensor 2 is a thermal based of flow rate sensor that is formed by a flow splitting element 21 in the form of a fluid resistor provided inside the flow path 11, a narrow tube 22 that is provided so as to bypass the flow splitting element 21 at the front and rear thereof, a detecting mechanism 23 that is formed by a pair of coils 23a (see FIG. 2) that are provided in the narrow tube 22 and that detects values related to flow rates, and a flow rate calculating section 41 that is created by utilizing a calculation function of the control mechanism 4 and that calculates flow rates based on outputs from the detecting mechanism 23.

More specifically, the respective coils 23a are both electrical heating wires, and a temperature control circuit (not shown in the drawings) is connected thereto so as to maintain the respective coils 23a at a predetermined temperature. The values of the voltages that are applied to each coil 23a by this temperature control circuit are output from the detecting mechanism 23 to the flow rate calculating section 41, and the flow rate calculating section 41 calculates the flow rates based on the respective voltage values.

Note that this flow rate sensor is not limited to being a thermal based of flow rate sensor, and various types of flow rate sensor such as differential pressure flow rate sensors, ultrasonic wave flow rate sensors, and Coriolis flow rate sensors and the like may also be used.

The control mechanism 4 is an electronic circuit that is provided with a CPU, memory, an A/D-D/A converter, input/output means, and drivers and the like. As a result of the CPU and peripheral devices thereof operating in cooperation with each other based on a program for the flow rate control device that is stored in the memory, the control mechanism 4 demonstrates functions of a calculating circuit of the valve control section 42 and the like as well as of the flow rate calculating section 41, which are component elements of the flow rate sensor 2.

As is described above, the flow rate calculating section 41 calculates flow rates of fluids flowing through the flow path 11 based on outputs from the detecting mechanism 23, and outputs the resulting values (hereinafter, these are referred to as 'measured flow rate values').

As is shown in FIG. 2, the valve control section 42 receives target flow rates input by an operator or supplied via communication from an external device or the like, and measured flow rates output from the flow rate calculating section 41, and performs PID feedback control on the aperture angle of the valve 3 such that deviations between the target flow rates and the measured flow rates are minimalized.

Figure 3:
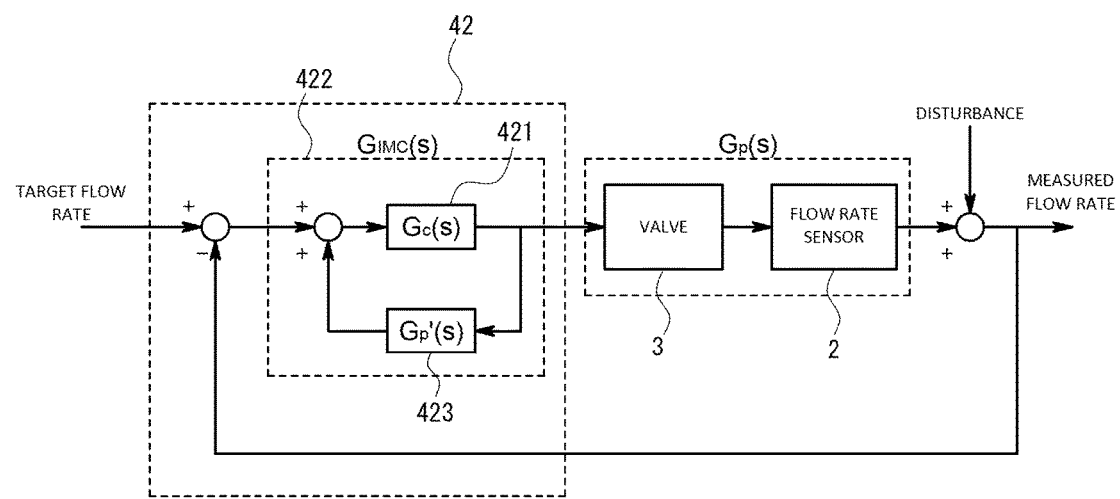
FIG. 3 is a control block wiring diagram of a valve control section according to the same embodiment.

More specifically, the valve control section 42 has a structure that, as is shown by the control block wiring diagram in FIG. 3, in addition to a PID controller 421, also includes an IMC (Internal Model Controller) 422.

In FIG. 3, $G_p(s)$ is a transfer function of the actual processing (i.e., of a system including the valve 3 and the flow rate sensor 2), and varies depending on the type of apparatus.

$G_c(s)$ is a transfer function of the PID controller 421 and is expressed by the following Formula (1).

$$G_c(s)=K_p(1+1/T_i \cdot s+T_d \cdot s) \quad (1)$$

Here, $K_p$ is the proportional gain, $T_i$ is the integrated time, and s is the Laplace transform.

$G_p'(s)$ is a transfer function of a processing model 423.

The IMC 422 is a system expressed by a transfer function $G_{IMC}(s)$ obtained from $G_p(s)$, $G_c(s)$, and $G_p'(s)$.

In this embodiment, by appropriately setting the processing model 423 so as to determine $G_{IMC}(s)$, a transfer function serving as a feedback system which includes the valve control section 42, the valve 3, and the flow rate sensor 2 is constructed so as to provide a first order lag if dead time is disregarded.

Namely, if a transfer function of the valve 3 is taken as $1/(f_1 \cdot s+1)$, and a transfer function of the flow rate sensor 2 is taken as $1/(e_1 \cdot s+1)$, then the transfer function Gp(s) is expressed as in Formula (2).

$$G_p(s)=(1/(f_1 \cdot s+1))(1/(e_1 \cdot s+1)) \quad (2)$$

In addition, $G_{IMC}(s)$ is set in the flowing manner.

$$G_{IMC}(s)=(x_1 \cdot s+1)(x_2 \cdot s+1)/(T \cdot s) \quad (3)$$

Here, $x_1$ and $x_2$ are set such that they form the same constants as $f_1$ and $e_1$ respectively.

As a result, the transfer function $G_1(s)$ obtained by connecting in series the IMC 422 and the valve 3 and flow rate sensor 2 is expressed as in the flowing Formula (4).

$$G_1(s)=G_{IMC}(s) \cdot G_p(s)=1/(T \cdot s) \quad (4)$$

In addition, as is described above, the transfer function G(s) of the overall system including the feedback system provides a first order lag as is shown below in Formula (5) if the dead time is disregarded.

$$G(s)=1/(1+T \cdot s) \quad (5)$$

This can be rewritten in the manner shown by the following Formula (6).

$$Qout=1/(1+T/s) \cdot Qset=1/(1+1/Kp \cdot s) \cdot Qset \quad (6)$$

Here, Qset is the target flow rate value and Qout is the measured flow rate value. 1/Kp is an inverse function of the time constant T.

Moreover, in this embodiment, as is shown in FIG. 2, the control mechanism 4 is further provided with the functions of a response lag input section 43, a response lag measurement section 44, a response lag storage section 45, and a response lag generating section 46.

The response lag input section 43 receives response lag setting values, which are values showing response lags of the flow rate control device 100, via an input means such as a keyboard or the like, or via communication. The response lag setting values are designated by an operator and, here, are values relating to first order lag elements of the response lag in the measured flow rate relative to the target flow rate. More specifically, the response lag setting values are time constants (i.e., a time from a flow rate start until 63% of a target flow rate is achieved). In addition to this, the response lag setting values may also be approximately a four-fold time constant (i.e., a time from a flow rate start until 98% of a target flow rate is achieved), or may also be a proportion (i.e., %) of the current response lag. Hereinafter, the response lag setting values may also be referred to as a set time constant.

The response lag measurement section 44 measures the response lag (here, this is a time constant of the first order lag and, hereinafter, is referred to as a measurement time constant) resulting from the control being performed at the current point in time. To achieve this, the response lag measurement section 44, for example, supplies a step signal as the target flow rate and, by measuring the indicial response at that time, calculates the measurement time constant. In addition to this, the measurement response may also be calculated using an impulse response or a ramp response or the like. The measurements of the response lag by the response lag measurement section 44 are made both before the actual flow rate control is started and during idle periods.

The response lag storage section 45 is set in a predetermined area of the memory, and is where the measurement time constants measured by the response lag measurement section 44 are stored. At this time, the response lag storage section 45 stores conditions at the time of measurement together with the respective measurement time constants as a pair in table form such as is shown, for example, in FIG. 4. These conditions are ambient conditions such as the type of fluid, the temperature, and the pressure and the like.

The response lag generating section 46 adjusts control parameters in the valve control section 42 such that the time constants resulting from this control are the same as the set time constants received by the response lag input section 43.

More specifically, as is described above, the responsiveness from the valve control section 42 is set as a first order lag by the IMC 422. Accordingly, a relationship between the time constant T and the proportional gain Kp generated by the PID controller 421 is as follows.

$$Kp=1/T \quad (7)$$

Therefore, the response lag generating section 46 refers to the response lag storage section 45, and calculates the ratio from the measurement time constant in the same type of measurement conditions and the proportional gain at that time. The response lag generating section 46 then calculates the proportional gain to form the set time constant from this ratio, and replaces the proportional gain currently being used with this new proportional gain.

The formula used to calculate the theoretical new proportional gain is shown in Formula (8), and the response lag generating section 46 performs an equivalent calculation to this in order to set the new proportional gain.

$$Kp_1=Kp_0 \cdot T_1/T_0 \quad (8)$$

Here, $Kp_1$ is the new proportional gain, $Kp_0$ is the current proportional gain, $T_1$ is the set time constant, and $T_0$ is the measurement time constant.

Therefore, according to this type of structure, all an operator needs to do is to input a desired set time constant, and the response lag of this flow rate control device 100 is auto-tuned to this set time constant.

Accordingly, according to the flow rate control device 100 of the present embodiment, simply by setting the same responsiveness as the responsiveness of the flow rate control device currently being used, the current flow rate can be easily replaced without having to perform any other measures such as, for example, readjusting the target flow rate.

Moreover, conventionally, in the field of flow rate control devices in which fast responsiveness has hitherto been sought, this effect, namely, the fact that constant responsiveness down-tuning by an operator is now possible for the first time can be said to be a remarkable breakthrough.

On the other hand, if faster responsiveness is sought, then it is sufficient if the value of the input set time constant is reduced to its performance limit, and this enables the capabilities inherent in this flow rate control device to be fully utilized.

Moreover, because the time constants that are used as response lag set values are values that enable a user to intuitively ascertain the responsiveness with ease, they also have the advantage of being easy to use.

In addition, in order to obtain the same functions as the present flow rate control device 100, it is also possible to calculate and fix the respective control coefficients ($K_p$, $T_i$, $T_d$) of the PID control such that they are the same as the input set time constants (i.e., the desired response lag). However, the respective control coefficients can be freely supplied independently from the control targets, and, currently, optimum values for each cannot be calculated using an algebraic method but must be determined by trial and error. Therefore, there are times when an excessive amount of time is needed in order to calculate the response lag settings.

In contrast to this, in the present embodiment, because the IMC 422 is provided in addition to the PID controller 421, and a structure is provided beforehand in which the responsiveness obtained from valve control provides a first order lag, as is described above, of the three control coefficients, only the proportional gain Kp needs to be adjusted in order to set the time constant. Accordingly, without placing any heavy load on the calculation circuits, the response lag can easily be set automatically such that is the same as the set time constant.

Note that the present invention is not limited to the above-described embodiment.

For example, in the above-described embodiment, the response lag generating section 46 refers to the response lag storage section 45, and retrieves the measurement time constant in the same type of ambient conditions from the past as well as the proportional gain from that past time, and then, based on these, determines the proportional gain, however, it is also possible to determine the measurement time constant by matching the ambient conditions in advance to the ambient conditions during the actual flow rate control, and then calculating the proportional gain based on these such that the set time constant is established. If this type of structure is employed, then there is no need to store past ambient conditions in the response lag storage section.

It is also possible to set the proportional gain by performing feedback control to gradually change the proportional gain such that there are minimal deviations between the measurement time constant and the set time constant.

During the actual flow rate control, if the temperature of the fluid or the pressure of the fluid before and behind the valve varies, then in order to maintain responsiveness, it is also possible to correct the proportional gain $K_p1$ in the response lag generating section using either one or more of these. For example, the following Formula (9) shows an example of a correction calculation based on variations in the pressure p.

$$K_{p1}'=(X_n p^n+X_{n-1}p^{n-1}+ \ldots +X_1 p)K_{p1}+b \qquad (9)$$

Here, $X_1 \sim X_n$ are coefficients determined in advance via experiment and the like, and $K_{p1}$ is the proportional gain after the correction calculation.

Figure 5:
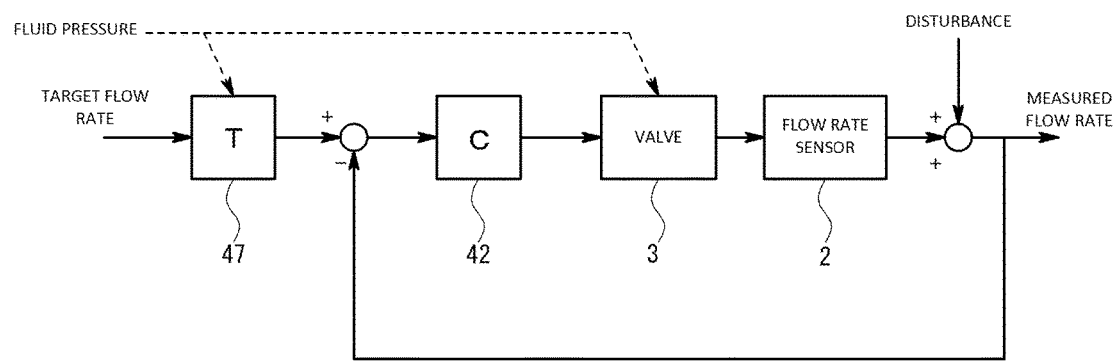
FIG. 5 is a control block wiring diagram according to another embodiment of the present invention.

Moreover, as is shown in FIG. 5, it is also possible for the response speed to be set by adding a filter 47, which is a calculation circuit that implements first order lag processing and the like on target flow rate values, and then setting the time constants. In this case, the target flow rate values are corrected by the filter 47.

Furthermore, because the responsiveness of the flow rate control device, in particular, the responsiveness of the valve 3 is changed by the pressure of the fluid (i.e., the pressure on the upstream side and/or the pressure on the downstream side of the valve), it is more preferable for control to be performed such that these pressure changes are canceled out and the response lag is maintained (i.e., is compensated) at a set value. Specifically, a structure may be employed in which, for example, the time constant of the filter 47 shown in FIG. 5 changes in accordance with the measured fluid pressure (here, the pressure on the upstream side) so that changes in the responsiveness caused by pressure are compensated.

It is also possible for either limits to not be set or for limits to be set for response lag values that are able to be input using the response lag input section (for example, set time constants).

In the case of the former, for example, an input in which the value of the response lag is 0 is also received, however, in this case, the flow rate control device operates in a state of maximum responsiveness, namely, in a state in which the response lag is at a minimum. In other words, if a value that exceeds the maximum possible responsiveness of the flow rate control device is input as the response lag, then this value is disregarded, and the flow rate control device operates at its maximum possible responsiveness.

In the case of the latter, even if a response lag such as, for example, 0 that exceeds the maximum possible responsiveness of the flow rate control device is input, then instead of accepting this, either a new input may be asked for, or else the minimum response lag value that is possible in accordance with the specifications may be displayed, and then the flow rate control device may be operated using this response lag.

Furthermore, it should be understood that the present invention is not limited to the above-described embodiment, and that various modifications and the like may be made thereto insofar as they do not depart from the spirit or scope of the present invention.

DESCRIPTION OF THE REFERENCE NUMERALS

100 . . . Flow rate control device
3 . . . Fluid control valve
43 . . . Response lag input section
44 . . . Response lag measurement section
45 . . . Response lag storage section
46 . . . Response lag generating section

What is claimed is:
1. A flow rate control device that performs feedback control of a fluid control valve such that a measured flow rate closely approximates a target flow rate, comprising:
a valve control section that receives the target flow rate and the measured flow rate, and performs the feedback control of the fluid control valve based on the target flow rate, the measured flow rate, and control parameters set therein;
a response lag input section that inputs a response lag set value, which is a value showing a response lag that an operator wishes to set;
a response lag generating section that adjusts at least one of the control parameters based on the response lag set value, and generates response lags used in the feedback control in accordance with the response lag set value; and
a response lag measurement section that measures a response lag by performing feedback control, wherein
the response lag generating section calculates, based on measured response lags measured by the response lag measurement section and on a feedback gain set at that time, a new feedback gain that forms the set response lag shown in the response lag set value, and replaces the current feedback gain with the new feedback gain.
2. The flow rate control device according to claim 1, wherein the response lag set value is a value that shows a first order lag, a second order lag, or a lag of a greater order than this from which dead time has been excluded.

3. The flow rate control device according to claim 2, wherein the value showing the first order lag, the second order lag, or the lag of a greater order than this is a time constant.

4. The flow rate control device according to claim 1, wherein the feedback control includes at least proportional control, and is set such that a response lag excluding dead time is changed to a first order lag by using an internal model controller (IMC).

5. A non-transitory storage medium on which is stored a program for a flow rate control device that performs feedback control of a fluid control valve such that a measured flow rate closely approximates a target flow rate, wherein the program enables the flow rate control device to perform the functions of:

a valve control section that receives the target flow rate and the measured flow rate, and performs the feedback control of the fluid control valve based on the target flow rate, the measured flow rate, and control parameters set therein;

a response lag input section that inputs a response lag set value, which is a value showing a response lag that an operator wishes to set;

a response lag generating section that adjusts at least one of the control parameters based on the response lag set value, and generates response lags used in the feedback control in accordance with the response lag set value; and a response lag measurement section that measures a response lag by performing feedback control, wherein the response lag generating section calculates, based on measured response lags measured by the response lag measurement section and on a feedback gain set at that time, a new feedback gain that forms the set response lag shown in the response lag set value, and replaces the current feedback gain with the new feedback gain.

* * * * *